(12) United States Patent
Mowrer et al.

(10) Patent No.: US 7,834,121 B2
(45) Date of Patent: Nov. 16, 2010

(54) SILICONE RESIN CONTAINING COATING COMPOSITIONS, RELATED COATED SUBSTRATES AND METHODS

(75) Inventors: Norman R. Mowrer, Cumming, GA (US); Kamlesh J. Sheth, Suwanee, GA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 864 days.

(21) Appl. No.: 11/694,031

(22) Filed: Mar. 30, 2007

(65) Prior Publication Data

US 2007/0213492 A1 Sep. 13, 2007

Related U.S. Application Data

(63) Continuation-in-part of application No. 10/943,241, filed on Sep. 15, 2004, now Pat. No. 7,459,515.

(51) Int. Cl.
*C08G 77/26* (2006.01)
(52) U.S. Cl. .............................. 528/38; 528/34; 528/39; 525/476
(58) Field of Classification Search .................. 528/38, 528/39; 525/476
See application file for complete search history.

(56) References Cited

U.S. PATENT DOCUMENTS

| | | | | |
|---|---|---|---|---|
| 3,971,747 A * | 7/1976 | Bank et al. | ................... | 523/435 |
| 4,033,924 A | 7/1977 | Mine et al. | .............. | 260/37 SB |
| 4,233,428 A | 11/1980 | Endo | .......................... | 525/507 |
| 4,250,074 A | 2/1981 | Foscante et al. | ........ | 260/32.8 EP |
| 4,252,933 A * | 2/1981 | Sumida | ........................ | 528/33 |
| 4,797,446 A * | 1/1989 | Dietlein et al. | .............. | 524/860 |
| 4,851,481 A | 7/1989 | Kuriyama et al. | ........... | 525/454 |
| 5,166,293 A | 11/1992 | Okinoshima et al. | .......... | 528/15 |
| 5,591,783 A * | 1/1997 | Kobayashi et al. | ............ | 522/31 |
| 5,618,860 A * | 4/1997 | Mowrer et al. | .............. | 523/421 |
| 5,703,178 A * | 12/1997 | Gasmena | .................... | 525/476 |
| 5,804,616 A | 9/1998 | Mowrer et al. | .............. | 523/421 |
| 5,889,124 A | 3/1999 | Ando et al. | .................. | 525/403 |
| 6,013,752 A | 1/2000 | Mowrer et al. | ................ | 528/26 |
| 6,169,066 B1 | 1/2001 | Gasmena | .................... | 510/466 |
| 6,281,321 B1 | 8/2001 | Kelly et al. | ................... | 528/17 |
| 6,344,520 B1 * | 2/2002 | Greene | ........................ | 525/100 |
| 6,467,961 B2 | 10/2002 | Nakamaru et al. | ............ | 384/13 |
| 6,639,025 B2 | 10/2003 | Sakugawa | .................... | 525/476 |
| 6,653,378 B2 * | 11/2003 | Ferritto et al. | .............. | 524/267 |
| 6,713,586 B2 | 3/2004 | Greene | ........................ | 528/34 |
| 6,756,077 B2 * | 6/2004 | Yu | ............................... | 427/387 |
| 7,026,398 B2 * | 4/2006 | Monkiewicz et al. | ........ | 525/100 |
| 7,125,609 B2 * | 10/2006 | Klaassens et al. | ........... | 428/447 |
| 7,126,020 B2 | 10/2006 | Herzig et al. | ................. | 556/413 |
| 7,264,669 B1 * | 9/2007 | Tomasino et al. | ...... | 106/287.11 |
| 2003/0153682 A1 | 8/2003 | Sakugawa | .................... | 525/100 |
| 2004/0210010 A1 | 10/2004 | Smith | ......................... | 525/476 |
| 2004/0249044 A1 | 12/2004 | Nguyenquang et al. | ..... | 524/430 |
| 2006/0058451 A1 | 3/2006 | Gommans et al. | ........... | 524/588 |
| 2009/0234071 A1 * | 9/2009 | Martz et al. | .................. | 525/100 |

FOREIGN PATENT DOCUMENTS

| | | |
|---|---|---|
| EP | 1 086 974 A1 | 3/2001 |
| WO | WO 80/00847 | 5/1980 |
| WO | WO 96/16109 | 5/1996 |
| WO | WO 97/42027 | 11/1997 |
| WO | WO 98/32792 | 7/1998 |
| WO | WO 2005/100446 A1 | 10/2005 |

OTHER PUBLICATIONS

One Step Ahead, Organofunctional Silanes From Wacker, by Wacker Chemie AG, Munchen, Germany, Jan. 2005.
Alpha-Silane-Terminated Polymers As Novel Binders for Fast Curing Elastic Adhesives, presentation by Wolfram Schindler at the European Coatings Show 2005, by Wacker Chemie AG, Munchen, Germany, Apr. 2005.
Silres® HP1000 Silicone Resin, product description by Wacker Chemie AG, Munchen, Germany, Version 3.00, Jan. 2, 2006.
CoatOSil 2810 Copolymer, product description by Momentive Performance Materials Inc., Mar. 2007.

* cited by examiner

*Primary Examiner*—Margaret G Moore
(74) *Attorney, Agent, or Firm*—Donald R Palladino

(57) ABSTRACT

Disclosed are coating compositions that include both (a) an alkoxy-functional and/or silanol-functional silicone; and (b) an epoxy-functional silicone. Also disclosed are substrates at least partially coated with a coating deposited from such a composition and methods for coating substrates with such compositions.

20 Claims, No Drawings

SILICONE RESIN CONTAINING COATING COMPOSITIONS, RELATED COATED SUBSTRATES AND METHODS

CROSS-REFERENCE TO RELATED APPLICATIONS

This application is a continuation-in-part of U.S. patent application Ser. No. 10/943,241, now U.S. Pat. No. 7,459,515, entitled, "Fast-Curing Modified Siloxane Compositions", which was filed Sep. 15, 2004.

FIELD OF THE INVENTION

The present invention relates to coating compositions that comprise silicones. More particularly, the present invention relates to such coating compositions that include both (a) an alkoxy-functional and/or silanol-functional silicone; and (b) an epoxy-functional silicone.

BACKGROUND OF THE INVENTION

The use of siloxane resins in forming protective coatings can, in certain applications, contribute properties of flexibility, impact resistance and/or weather resistance to the resulting cured coating. In some cases, a polysiloxane resin has been combined with an epoxy resin to provide improved properties of impact resistance, flexibility, corrosion resistance, and/or weatherability to the resulting coating.

Siloxane resins are sometimes used with a base resin material, e.g., an epoxy resin, and reacted by an acid or base catalyzed hydrolysis of the siloxane resin and an aminosilane, followed by condensation of the resulting silanol groups formed during hydrolysis and reaction of amine with epoxy. This reaction mechanism can be initiated by the presence of moisture conducted in the presence of an amine, and driven to completion by evaporation of alcohol formed during the hydrolysis reaction. While such epoxy-polysiloxane coating compositions are useful in forming protective coatings providing a degree of coating hardness, flexibility, impact resistance, weatherability, and corrosion and/or chemical resistance to an underlying substrate, the need to provide coatings having reduced volatile organic content (VOC) has sometimes necessitated the use of lower molecular weight resins in the formulation of such coatings.

A disadvantage, however, with using such lower molecular weight resins is that the desired above-noted coating properties are acquired by increasing the cross-link density of these resins, which can result in the coating having a reduced degree of flexibility. In certain cases, an organic material, such as an acrylic resin and/or an acrylate functional ingredient, such as an acrylate oligomer, is included in such compositions to provide improved flexibility. Such materials can also sometimes be used to reduce the drying or cure time of the coating over a broad temperature range. Drawbacks to the presence of such materials, however, can be reduced weatherability and/or stability.

It is, therefore, desired to provide coating compositions comprising silicone resins that are capable, in at least some cases, of providing a degree of coating flexibility, hardness, impact resistance, corrosion resistance and/or chemical resistance that is the same as or better than that of known polysiloxane coating compositions that include an acrylic resin and/or acrylate functional ingredients, while at the same time providing such properties within compositions that, in at least some cases, can have improved weatherability and/or stability. Moreover, it would be desirable to provide such coating compositions that, in at least some cases, are "fast-curing".

SUMMARY OF THE INVENTION

In certain respects, the present invention is directed to coating compositions that comprise: (a) an alkoxy-functional and/or silanol-functional silicone; (b) an epoxy-functional silicone; and (c) a curing agent.

In other respects, the present invention is directed to coating compositions that comprise: (a) an alkoxy-functional and/or silanol-functional silicone; (b) an epoxy-functional silicone; (c) a hydroxy-functional and/or epoxy-functional ingredient different from (a) and (b); and (d) a curing agent.

The present invention is also directed to, inter alia, substrates at least partially coated with a coating deposited from such compositions, methods of making such compositions, and methods of at least partially coating a substrate with such compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, certain embodiments of the present invention are directed to coating compositions. In certain embodiments, the coating compositions of the present invention are embodied in the form of a two-component system, wherein the ingredients are provided in two separate containers that are combined and mixed together prior to use. For example, in certain embodiments, the coating compositions of the present invention are embodied as a two-component system wherein a first component comprises (i) an alkoxy-functional and/or silanol-functional silicone, and (ii) an epoxy-functional silicone; and a second component comprises a curing agent. In other embodiments, the coating compositions of the present invention are provided in the form of a single component system wherein all of the coating components are combined in a single container.

In certain embodiments, the coating compositions of the present invention comprise a modified siloxane composition. As used herein, the term "modified siloxane composition" means that the composition includes a silicone that is combined with other resin ingredients, such as acrylics, polyesters, polyethers, and/or polyurethanes, to provide a copolymer or an interpenetrating polymer network (IPN) having hybrid properties of impact resistance, flexibility, weatherability, corrosion resistance and/or chemical resistance that are not otherwise provided by a compositions comprising a silicone resin alone. Such properties can be the result of the selective choice of ingredients, the relative amounts of the ingredients, and/or the manner in which the selected ingredients are combined together.

As previously indicated, in certain embodiments, the coating compositions of the present invention comprise an alkoxy-functional and/or silanol-functional silicone. In other words, the coating compositions of the present invention comprise an alkoxy-functional silicone, a silanol-functional silicone, or a mixture thereof. As used herein, the term "alkoxy-functional and/or silanol-functional silicone" refers to silicones comprising alkoxy functional groups, —OR, and/or hydroxy functional groups, —OH, wherein R is an alkyl group or an aryl group. As used herein, the term "silicone" refers to polysiloxane polymers, which are based on a structure comprising alternate silicon and oxygen atoms. In certain embodiments, the alkoxy-functional and/or silanol-functional silicone comprises a compound represented by the general formula:

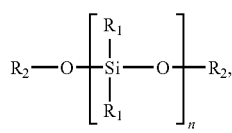

wherein each $R_1$, which may be same or different, is selected from the group consisting of a hydroxy group, an alkyl group having up to six carbon atoms, an aryl group having up to six carbon atoms, and an alkoxy group having up to six carbon atoms; each $R_2$, which may be the same or different, is selected from the group consisting of hydrogen, an alkyl group having up to six carbon atoms, and an aryl group having up to six carbon atoms. In certain embodiments, $R_1$ and $R_2$ comprise groups having less than six carbon atoms to facilitate rapid hydrolysis, which reaction is driven by the volatility of the alcohol analog product of the hydrolysis. In certain embodiments, "n" is selected so that the foregoing silicone has a weight average molecular weight in the range of from 400 to 10,000, such as from 800 to 2,500.

Alkoxy-functional and/or silanol-functional silicones which are suitable for use in the present invention are commercially available and include, for example, (a) methoxy-functional silicones, such as DC-3074 and DC-3037 commercially available from Dow Corning; and GE SR191, SY-550, and SY-231 commercially available from Wacker Silicones located in Adrian, Mich.; and (b) silanol-functional silicones, such as Dow Corning's DC-840, Z6018, Q1-2530 and 6-2230.

In certain embodiments, the previously described alkoxy-functional and/or silanol-functional silicone is present in the coating compositions of the present invention in an amount ranging from 5 to 80 percent by weight, such as 10 to 30 percent by weight, or, in some cases, 10 to 25 percent by weight, with the weight percents being based on the total weight of the coating composition.

As previously indicated, the coating compositions of the present invention also comprise an epoxy-functional silicone. As used herein, the term "epoxy-functional silicone" refers to silicones comprising epoxy functional groups,

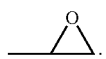

In certain embodiments, the coating compositions of the present invention comprise an epoxy-functional silicone comprising a plurality of epoxy functional groups, i.e., two or more epoxy functional groups. In certain embodiments of the present invention, the coating composition comprises an epoxy-functional silicone comprising two epoxy functional groups.

In certain embodiments, the coating compositions of the present invention comprise an epoxy-functional silicone represented by one of the following general structures:

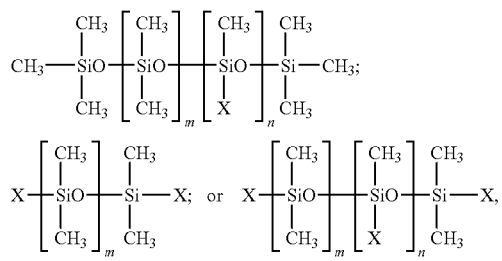

wherein m is an integer having a value ranging from 1 to 10,000, such as 5 to 10,000; n is an integer having a value ranging from 1 to 100, such as 2 to 100; and each X, which may be the same or different, represents an epoxy containing group, i.e., a moiety comprising an epoxy functional group, such as, for example:

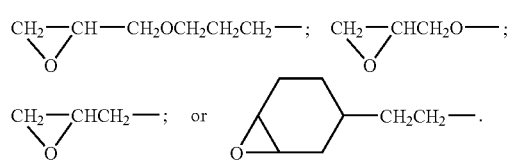

Specific examples of such epoxy-functional silicones, which are suitable for use in the present invention, include those represented by the general structure:

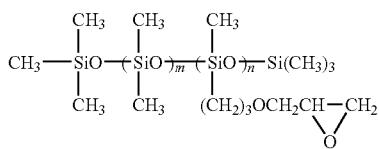

and those represented by the general structure:

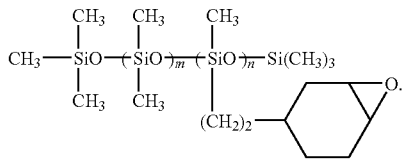

Epoxy-functional silicones of the type discussed in this paragraph are commercially available. Examples include CoatO-Sil™ 2810, commercially available from GE Advanced Materials, Wilton, Conn.; KF-101, KF-102, KF-105, and KF-1000, commercially available from Shin-Etsu Chemical Co., Ltd.; and Silikoftal® ED and Silikoftal® EW, commercially available from Tego Chemie.

Epoxy-functional silicones suitable for use in the present invention, and methods for their preparation, are also described in U.S. Pat. No. 6,713,586 at col. 3, line 66 to col. 6, line 62, the cited portion of which being incorporated herein by reference. In certain embodiments of the present invention, the coating composition comprises an epoxy-functional silicone represented by the general formula:

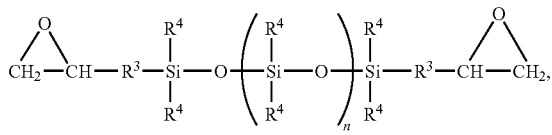

wherein each $R^3$, which may be the same or different, is an alkylene containing 1 to 18 carbon atoms, optionally interspersed with oxygen (provided that the oxygen is not bonded to the Si-group) or an arylene group; each, $R^4$, which may be the same or different, is an alkyl group, an aryl group, a vinyl group, a glycol, an alkoxy group containing 1 to 8 carbon atoms, or an epoxy group (provided that the oxygen is not bonded to the Si-group); and n is greater than or equal to 1. Epoxy-functional silicones of the type discussed in this paragraph are commercially available and include SILRES® HP-1000 and HP-1250, commercially available from Wacker Silicones.

In certain embodiments, the previously described epoxy-functional silicone is present in the coating compositions of the present invention in an amount ranging from 5 to 80 percent by weight, such as 10 to 30 percent by weight, or, in some cases, 5 to 20 percent by weight, with the weight percents being based on the total weight of the coating composition. In certain embodiments, the weight ratio of the alkoxy-functional and/or silanol-functional silicone to the epoxy-functional silicone is at least 1:1, in some cases at least 2:1, in yet other cases, from 2:1 to 3:1.

In addition to the previously described components, the coating compositions of the present invention also comprise a curing agent. Suitable curing agents include, for example, amines, aminosilanes, ketimines, aldimines, and mixtures thereof. In certain embodiments of the coating compositions of the present invention, the curing agent reacts with the epoxy-functional groups of the previously described epoxy-functional silicone. In certain embodiments, the curing agent may also react with other components of the coating composition, such as certain of the components to be described in detail below.

Suitable amine curing agents for use in the present invention include polyamines, aliphatic amine adducts, polyamidoamines, cycloaliphatic amines and polyamines, and cycloaliphatic amine adducts, and aromatic amines, as described in United States Patent Application Publication 2006/0058451 at [0051], the cited portion of which being incorporated herein by reference.

Suitable aminosilane curing agents for use in the present invention include those having the general formula: Y—Si—(O—X)$_n$, wherein n is 2 or 3; each X, which can be the same or different, is an alkyl, hydroxyalkyl, alkoxyalkyl or hydroxyalkoxyalkyl group containing less than six carbon atoms; and Y is H(HNR)$_c$, wherein "c" is an integer having a value of from 1 to 6; and each R is a difunctional organic radical independently selected from the group consisting of aryl, alkyl, dialkylaryl, alkoxyalkyl, and cycloalkyl radicals, wherein R can vary within each Y molecule. Such materials are further described in United States Patent Application Publication 2006/0058451 at [0052] to [0054], the cited portion of which being incorporated herein by reference.

Suitable ketimine and aldimine curing agents for use in the present invention include those obtained by the reaction of an amine with either a ketone or an aldehyde, respectively, and include those materials identified in United States Patent Application Publication 2006/0058451 at [0055], the cited portion of which being incorporated herein by reference.

In certain embodiments of the coating compositions of the present invention, the curing agent comprises an aminosilane of the general formula: BR$_e$Si(OR$^3$)$_{3-e}$, wherein R is a C$_{1-18}$ hydrocarbon radical; R$^3$ is an alkyl radical having from 1 to 8 carbon atoms; e is 0, 1, or 2; and B is a radical of the formula CR$^2_2$—Y; wherein R$^2$ is hydrogen or an alkyl radical having from 1 to 4 carbon atoms and Y is a group comprising a nitrogen atom. Indeed, it is believed that, in at least some cases, the use of such a curing agent in coating compositions of the present invention can result in the production of coatings having further improved flexibility. Moreover, it is believed that coating compositions of the present invention formulated using such curing agent can, in at least some cases, be "fast-cure" compositions, even in the absence of an amine reactive ingredient selected from the groups consisting of acetoacetate-functional ingredients, acrylate-functional ingredients, which are described below. As used herein, the term "fast cure" composition refers to compositions that can form a dust free film in as little as 1 hour, in some cases 45 minutes, in some cases, in as little as 10 minutes, or, in yet other cases, in as little as 5 minutes, when applied to a substrate at 25° C. and a relative humidity of 70 percent.

Examples of suitable Y radicals in the preceding paragraph are —NH$_2$, —NHR$^4$ and —NR$^4_2$ groups, wherein R$^4$ is a monovalent organic radical optionally containing nitrogen and/or oxygen atoms, such as a monovalent hydrocarbon radical optionally containing nitrogen and/or oxygen atoms and having from 1 to 18 carbon atoms. Examples of suitable B radicals in the preceding paragraph are aminomethyl, methylaminomethyl, dimethylaminomethyl, diethylaminomethyl, dibutylaminomethyl, cyclohexylaminomethyl, anilinomethyl, 3-dimethylaminopropylaminomethyl, bis(3- dimethylaminopropyl)aminomethyl, and groups of the formulae —CH$_2$NHCOR$^4$, —CH$_2$NHCO$_2$R$^4$ or —CH$_2$NHCONHR$^4$, where R$^4$ is as defined above.

Specific examples of aminosilanes of the general formula BR$_e$Si(OR$^3$)$_{3-e}$, which are suitable for use in the present invention, include diethylaminomethylmethyldimethoxysilane, dibutylaminomethyltriethoxysilane, dibutylaminomethyltributoxysilane, cyclohexylaminomethyltrimethoxysilane, cyclohexylaminomethyltriethoxysilane, cyclohexylaminomethylmethyldiethoxysilane, anilinomethyltriethoxysilane, 3-dimethylaminopropylaminomethyltrimethoxysilane, and acetylaminomethylmethyldimethoxysilane. Such materials are described in U.S. Pat. No. 7,126,020 at col. 2, lines 37 to 49 and col. 3, line 62 to col. 4, line 52, the cited portions of which being incorporated by reference herein. In addition, such materials are also commercially available from Wacker Silicones under the Geniosil® tradename, such as Geniosil® XL 924, XL 926, and XL 973.

As will be appreciated, the type of curing agent(s) selected for inclusion in the coating compositions of the present invention will often depend on the particular type of application and type of other ingredients being used. As will also be appreciated, the coating compositions of the present invention can be formed using a combination of more than one type of curing agent. For example, and without limitation, a primary and/or secondary amine can be used in conjunction with an aminosilane. Additionally, polyether amino-functional amines can be used to flexibilize the curative package and/or also reduce the raw material cost of the curative materials. Secondary amines can be used to adduct epoxy functionality and to form a highly reactive polymer, e.g., a star polymer.

In certain embodiments, the curing agent is present in the coating composition in an amount ranging from 1 to 30 percent by weight, such as 2 to 25 percent by weight, or, in some cases, 5 to 18 percent by weight, with the weight percents being based on the total weight of the coating composition. It should be understood that one or more of the above-described curing agents can be used depending on the particular desired method for making the composition, and the desired properties for the resulting cured film coating, with the total amount of such curing agent used being within the above-identified range.

In addition to the previously described components, the coating compositions of the present invention may comprise any of a variety of additional optional components. For example, in certain embodiments, the coating compositions of the present invention comprise a hydroxy-functional and/or epoxy-functional ingredient different from the previously described silicones. In other embodiments, however, the coating compositions of the present invention are substantially free, or, in some cases, completely free, of such a component. As used herein, when it is stated that a coating composition of the present invention is "substantially free" of a particular material, it means that the material being discussed is present in the composition, if at all, as an incidental impurity. In other words, the material does not affect the properties of the composition. Moreover, when it is stated that a coating composition of the present invention is "completely free" of a particular material it means that the material being discussed is not present in the composition at all.

Examples of suitable-hydroxy functional ingredients different from the previously described silicones are carbinols selected from the group including acrylic resins, polyester resins, phenolic resins, phenolic silane resins, and mixtures thereof. Such resins are described U.S. Pat. No. 6,013,752 at col. 6, line 57 to col. 8, line 19, the cited portion of which being incorporated herein by reference.

Examples of suitable-epoxy functional ingredients different from the previously described silicones include those selected from the group including epoxy resins, i.e., resins that include more than one 1,2-epoxy group per molecule, as well as epoxy-functional acrylic resins, epoxy-functional silanes, and combinations thereof.

Suitable epoxy resins having more than one 1,2-epoxy group per mole include, for example, those that are saturated or unsaturated, aliphatic, cycloaliphatic, or heterocyclic. In certain embodiments, such epoxy resins are liquid rather than solid, have an epoxide equivalent weight of 100 to 2,000, such as 100 to 500, and have a reactivity of two. Suitable such polyepoxides are described in U.S. Pat. No. 3,183,198 at col. 3, line 27 to col. 4, line 64, the cited portion of which being incorporated herein by reference. In certain embodiments, the epoxy resin used can also contain some monomer units having only one oxirane group. Suitable epoxy resins are commercially available and include those identified in United States Patent Application Publication No. 2006/0058451 at [0043], the cited portion of which being incorporated herein by reference, and in U.S. Pat. No. 6,639,025 at col. 3, line 11 to col. 4, line 32, the cited portion of which being incorporated herein by reference.

Suitable epoxy-functional acrylic resins include glycidyl ether functional polymers, glycidyl methacrylate (GMA) functional resins, and any epoxy-functional materials, e.g., epoxidized Soya bean oil or the like. Such resins are commercially available and include those identified in United States Patent Application Publication No. 2006/0058451 at [0044], the cited portion of which being incorporated herein by reference.

Suitable epoxy-functional silanes are commercially available and include those identified in United States Patent Application Publication No. 2006/0058451 at [0045], the cited portion of which being incorporated herein by reference.

In certain embodiments, the hydroxy-functional and/or epoxy-functional ingredient different from the previously described silicones is present in the compositions of the present invention in an amount ranging from 1 to 50 percent by weight, such as 2 to 40 percent by weight, or, in some cases, 5 to 35 percent by weight, based on the total weight of the coating composition.

In certain embodiments, the coating compositions of the present invention comprise from 0.65 to 1.35 equivalents of amine groups to 1.0 equivalents of epoxy groups.

In addition, certain embodiments of the coating compositions of the present invention comprise a silane, including, for example, silanes having the general formula:

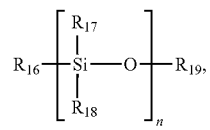

where R$_{16}$, and each R$_{17}$ and R$_{18}$ are independently selected from the group consisting of hydrogen and alkyl, aryl, cycloalkyl, alkoxy, aryloxy, hydroxyalkyl, alkoxyalkyl and hydroxyalkoxyalkyl groups containing up to six carbon atoms, and where R$_{19}$ is selected from the group consisting of hydrogen and alkyl and aryl groups having up to six carbon atoms. In certain embodiments, at least one of the groups include oxy constituents for polymerization, and "n" is in the range of from 1 to 5, and may have an average molecular weight in the range of from 150 to 600.

The silane is an optional ingredient in the coating compositions of the present invention and, therefore, in certain embodiments, the coating compositions of the present invention are substantially free, or, in some cases, completely free, of such an ingredient.

Suitable silanes are commercially available and include a phenyl/methyl methoxy-silane that is available, for example, from Dow Corning under the product name QP8-5314.

In certain embodiments, when used, the silane is present in the coating compositions of the present invention in an amount of up to 10 percent by weight, such as 0.5 to 5 percent by weight, or, in some cases 0.85 to 2 percent by weight, with the weight percents being based on the total weight of the coating composition.

In certain embodiments, particularly, in certain instances where a "fast cure" composition is desired, the coating compositions of the present invention may also comprise an amine reactive ingredient selected from the groups consisting of acetoacetate-functional ingredients, acrylate-functional ingredients, and mixtures thereof. Since such amine reactive ingredients are optional in the coating compositions of the present invention, certain embodiments of the coating compositions of the present invention are substantially free, or, in some cases, completely free, of such an amine reactive ingredient.

As used herein, the term "acetoacetate-functional ingredient" refers to both substituted and non-substituted acetoacetate-functional ingredients, and include, for example, those selected from the group including acetoacetate-functional diluents, acetoacetate-functional oligomers, acetoacetate-functional polymers, and mixtures thereof.

Suitable acetoacetate-functional ingredients include, for example, those having the general chemical formula $R_{20}$[OCOCH$_2$COCH$_2$]$_a$R$_{21}$, wherein $R_{20}$ can be selected from the group including acrylic, polyester, polyether, and urethane polymers or diluents, or any hydroxy-functional polymer that is capable of being functionalized with [OCOCH$_2$COCH$_2$], where "a" can be from 1 to 10, and where $R_{21}$, can be hydrogen or can be a carbon-containing group having up to about 6 carbon atoms.

Suitable acetatoacetate-functional ingredients are set forth in United States Patent Application Publication No. 2006/0058451 at [0022] to [0028], the cited portion of which being incorporated herein by reference.

As used herein, the term "acrylate-functional ingredient" refers to both substituted and non-substituted acrylate-functional ingredients. Suitable acrylate-functional ingredients include those selected from the group including acrylate-functional diluents, acrylate-functional oligomers, acrylate-functional polymers, and mixtures thereof, and include, for example, those having the general chemical formula: $R_{22}$[OCOCHCH]$_b$R$_{23}$, wherein $R_{22}$ can be selected from the group including acrylic, polyester, polyether, and urethane polymers or diluents, or any hydroxy-functional polymer that is capable of being functionalized with [OCOCHCH], where "b" can be from 1 to 10, and where $R_{23}$ can be hydrogen or can be a carbon-containing group having up to about 6 carbon atoms.

Suitable acrylate-functional ingredients are set forth in United States Patent Application Publication No. 2006/0058451 at [0034] to [0038], the cited portion of which being incorporated herein by reference.

In certain embodiments, when used, the foregoing amine-reactive ingredient is present in the coating compositions of the present invention in an amount of up to 40 percent by weight, such as 5 to 30 percent by weight, or, in some cases 7 to 25 percent by weight, with the weight percents being based on the total weight of the coating composition.

In certain embodiments, the coating compositions of the present invention comprise an elastomeric resin of the type described in U.S. Pat. No. 6,639,025 at col. 7, line 38 to col. 8, line 37, the cited portion of which being incorporated herein by reference. By contrast, in other embodiments, the coating compositions of the present invention are substantially free, or, in some cases, completely free, of such an elastomeric resin.

In certain embodiments, the coating compositions of the present invention comprise a silicon containing polyether of the type described in U.S. Pat. No. 5,703,178 at col. 4, line 64 to col. 5, line 43, the cited portion of which being incorporated herein by reference. By contrast, in other embodiments, the coating compositions of the present invention are substantially free, or, in some cases, completely free, of such a silicone containing polyether.

In certain embodiments, the coating compositions of the present invention comprise a silicone fluid of the type described in U.S. Pat. No. 6,169,066 at col. 3, lines 9 to 49, the cited portion of which being incorporated herein by reference. By contrast, in other embodiments, the coating compositions of the present invention are substantially free, or, in some cases, completely free, of such a silicone fluid.

In certain embodiments, the coating compositions of the present invention comprise an organic halogen-containing ingredient of the type described in U.S. Pat. No. 6,013,752 at col. 9, line 8 to col. 10, line 13, the cited portion of which being incorporated herein by reference. By contrast, in other embodiments, the coating compositions of the present invention are substantially free, or, in some cases, completely free, of such an organic halogen-containing ingredient.

In certain embodiments, the coating compositions of the present invention comprise a catalyst, such as an organometallic catalyst. Suitable organometallic catalysts can be useful for the purpose of accelerating the curing rate of the composition into a protective film coating over a broad temperature range. In certain use applications calling for ambient temperature cure of the composition, the organometallic catalyst may also be useful for providing accelerated cure rates at such ambient temperature cure conditions. Suitable catalysts include tin catalysts having the general formula

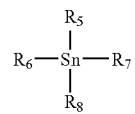

where $R_5$ and $R_6$ are each independently selected from alkyl, aryl, and alkoxy groups having up to eleven carbon atoms, and where $R_7$ and $R_8$ are each independently selected from the same groups as $R_5$ and $R_6$, or from the group consisting of inorganic atoms, such as halogens, sulfur or oxygen. Example catalysts include organotin materials such as dibutyl tin dilaurate, dibutyl tin diacetate, dibutyltin diacetyldiacetonate, and organotitanates.

Other useful organometallic catalysts include lead octoate, lead neodecanoate, bismuth nitrate, bismuth octoate, bismuth neodecanoate, bismuth napthenate, bismuth versalate, manganese napthenate/pentanedione, manganese octoate, vanadium acetylacetonate, zinc acetylacetonate, tin neodecanoate, stannous 2-ethyl hexanoate, lithium neodecanoate, stannic chloride, stannous octoate, zinc napthenate, zinc octoate, ferric acetylacetonate, zinc acetylacetonate, cobalt octoate, zirconium acetylacetonate, zirconium octoate, zirconium versalate, aluminum acetylacetonate, mercuric acetate, phenylmercuric acetate, phenylmercuric propionate, organopolymercury compounds, and crown ether complexes of Lanthamide metals. Many of these catalysts are commercially available. Commercial mixtures of catalysts useful in the invention include Cocure, Cotin, and Coscat catalysts, (Caschem, Inc.); Niax catalysts (Union Carbide); Polycat catalysts (Abbott Laboratories); Dabco catalysts (Air Products and Chemicals Inc.); Thancat catalysts (Texaco Chemical Co.); Stanclere TL (AKZO Chemicals Inc.); K-Kat Catalysts (King Industries), Curene catalysts (Anderson Development Co.); Bulab 600 catalysts (Buckman Laboratories, Inc.); Optic Part 14x (PolyTech Development Corp.); Metasol catalysts (Calgon Corporation); CC-1 and CC-3 catalysts (Cardinal Carolina Corp.); Conacure catalysts (Conap, Inc.); Cata-check catalysts (Ferro Corp.); KR catalysts (Kenrich Petrochemicals, Inc.); BiCAT catalysts (Shepherd Chemical Co.); Texacat, ZR, ZF, DD, DMDEE catalysts (Texaco Chemical Co.); Thor 535 catalysts (Thor Chemicals, Inc.); Toyocat catalysts (Tosoh USA, Inc.).

In certain embodiments, the catalyst is present in the coating composition in an amount of up to 10 percent by weight, such as 0.02 to 5 percent by weight, or, in some cases, 0.08 to 2 percent by weight, with the weight percents being based on the total weight of the coating composition. By contrast, in other embodiments, the coating compositions of the present invention are substantially free, or, in some cases, completely free, of such a catalyst.

In certain embodiments, the coating compositions of the present invention comprise a moisture scavenger for the purpose of, for example, intentionally reducing the presence of excess water during, for example, stages of forming the coating composition where excess water is not desired. Suitable moisture scavenging ingredients include those such as calcium compounds, such as $CaSO_4$-$\frac{1}{2}H_2O$, and calcium-metal alkoxides, such as tetraisopropyltitanate, tetra n butyl titanate-silane, QP-5314, vinylsilane (A171), and organic alkoxy compounds, such as triethylorthoformate, methylorthoformate, dimethoxypropane.

In certain embodiments, the moisture scavenger is present in the coating composition of the present invention in an amount of up to 10 weight percent, such as 0.25 to 5 weight percent, or, in some cases 0.5 to 2 weight percent, with the weight percents being based on the total weight of the coating composition. By contrast, in other embodiments, the coating compositions of the present invention are substantially free, or, in some cases, completely free, of such a moisture scavenger.

In addition, other ingredients useful in forming the coating compositions of this invention include water, solvents, plasticizers, extenders, fillers, hydrocarbon resin modifiers, and various types of additives such as UV stabilizers, pigment wetting agents, flow and leveling additives, thixatropes, defoamers and the like.

The sources of water in the coating compositions of the present invention can be, for example, from a reaction between ingredients, atmospheric humidity, and water present in one or more of the ingredients. Water may be added during the formation of the composition to accelerate cure depending on the particular cure conditions, e.g., such as the use of the composition in arid environments where cure takes place at ambient temperature conditions.

In certain embodiments, the coating compositions of the present invention comprise a sufficient amount of water to facilitate unblocking of any curing agent present in the form of a ketimine or aldimine for subsequent cross linking, and/or to hydrolyze any alkoxy functionality in any alkoxy-functional silicone, silane ingredient, and/or curing agent provided in the form of an aminosilane.

Organic solvents can be added if desired. Suitable solvents include, for example, esters, ethers, alcohols, ketones, glycols and the like. In certain embodiments, the coating compositions of the present invention comprise up to 25 percent by weight organic solvent, based on the total weight of the coating composition.

In certain embodiments, the coating compositions of the present invention comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coating compositions by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nanometers, such as less than 70 nanometers, or less than 30 nanometers. Nanoparticles can be produced by milling stock organic or inorganic pigments with grinding media having a particle size of less than 0.5 millimeters. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from, for example, 1 to 65 weight percent of the present compositions, such as from 3 to 40 weight percent or 5 to 35 weight percent, with weight percent based on the total weight of the compositions.

In certain embodiments, the compositions of the present invention comprise a finely divided particulate filler. Examples of fillers providing high heat resistance are barytes (barium sulfate), mica, micaceous iron oxide, aluminum flake, glass flake, stainless steel flake, and the like. Certain embodiments of the coating compositions of the present invention include up to 10 percent by weight filler based on the total weight of the composition.

In certain embodiments, the coating compositions of the present invention are substantially free, or, in some cases, completely free of any acrylic resin.

As previously indicated, the coating compositions of the present invention are, in certain embodiments, supplied as a two-component or two-package system in, for example, moisture proof containers. Generally speaking, Part "A" or a first package or component includes the alkoxy-functional and/or silanol-functional silicone and the epoxy-functional silicone; and Part "B" or a second package or component includes the curing agent.

In certain embodiments, when the two components or packages are combined in the presence of water, any curing agent provided in the form of a ketimine or aldimine is unblocked to expose amine functionality. The alkoxy-functional and/or silanol-functional silicone, any silane, and any curing agent in the form of an aminosilane comprising alkoxy groups undergoes hydrolysis in the presence of water, and polycondensation with themselves and with one another.

To the extent that the polycondensation product includes amine functionality it, as well as any free aminosilane, can adduct with the epoxy-functional ingredient(s) in the coating composition.

The combined ingredients used for forming the coating compositions of this invention are often provided in a moisture proof container to control or prevent unwanted evaporation and/or hydrolysis and condensation of the constituent chemical ingredients, thus increasing the shelf life of the mixture. Sealed metal cans are suitable.

Compositions of this invention can be applied to a desired substrate surface to protect it from weathering, impact, and exposure to corrosion and/or chemicals. Illustrative of substrates that can be treated using compositions of this invention include wood, plastic, concrete, vitreous surfaces, and metallic surfaces. Compositions of this invention are useful, for example, as a top coating disposed either directly onto the substrate surface itself or disposed onto a prior or other underlying coating. e.g., an inorganic or organic primer material, disposed on the substrate surface to achieve a desired purpose.

Compositions of this invention can be applied to a surface to be treated by conventional coating techniques such as, for example, dip coating, direct roll coating, reverse roll coating, curtain coating, spray coating, brush coating, and combinations thereof, and are sometimes applied in films of from 50 to 250 micrometers or, in some embodiments, up to 1.2 millimeters in thickness. If necessary, multiple layers can be applied to the surface to be protected. For use with a wooden substrate, e.g., in the furniture industry, a dry film thickness of 75 to 125 micrometers sometimes provides a desired degree of protection to the underlying surface.

The coating compositions of this invention can be formulated to provide the desired drying and cure times over a broad range of temperature conditions, e.g., under conditions of elevated temperature such as when the applied composition is subjected to a bake condition, and at ambient temperature conditions such as when the applied composition is subjected to temperature conditions that can and will vary depending on the temperature of the surrounding environment (e.g., that can vary from 5 to 50° C.).

As will be appreciated, in certain embodiments, the coating compositions of the present invention can be embodied in the form of a kit. Such kits may comprise: (a) a first container comprising: (i) an alkoxy-functional and/or silanol-functional silicone; (ii) an epoxy-functional silicone; and (iii) a hydroxy-functional and/or epoxy-functional ingredient different from (i) and (ii); and (b) a second container comprising a curing agent.

In addition, as will also be appreciated from the foregoing disclosure, the coating compositions of the present invention can be prepared by combining: (a) an alkoxy-functional and/or silanol-functional silicone; (b) an epoxy-functional silicone; (c) a curing agent, as well as one or more of the previously described optional components, among others.

Illustrating the invention are the following examples that are not to be considered as limiting the invention to their details. All parts and percentages in the examples, as well as throughout the specification, are by weight unless otherwise indicated.

Example 1

A coating composition was prepared using the components and amounts identified in Table 1. Part A was prepared by combining components 1 through 8 in a one quart can. The can containing the mixture was then placed on a Hockmeyer mixer fitted with a Cowles blade. The pigment was dispersed to 6 hegman fineness of grind and the thixatrope activated by dispersing the mixture at high speed for 30 minutes. During this time the temperature rose from 23° C. to about 75° C. The temperature was then lowered to 55° C. before addition of components 9 through 16. The combined mixture was then mixed until uniform. At this point, component 17 was sifted into the stirred mixture over 15 minutes. Stirring was continued for another 10 minutes after addition of component 17 to ensure uniformity. Part A had a Brookfield viscosity of 6000 cP at 25° C. and a calculated epoxide equivalent weight of 1318.99 grams per equivalent.

Part B was prepared by combining components 18 through 22 in a one quart can. The mixture was stirred with a metal spatula until uniform, which required less than 5 minutes. Part B had a calculated amine equivalent weight of 167.4 grams per equivalent and a Brookfield viscosity of less than 10 cP at 25° C.

TABLE 1

| Part | Component | Description | Amount (grams) |
|---|---|---|---|
| Part A | 1 | Adeka EP-4080E[1] | 198.63 |
| | 2 | Rhodafac RE-610[2] | 6.55 |
| | 3 | Byk-P105[3] | 7.88 |
| | 4 | Foamtrol 110[4] | 3.45 |
| | 5 | TR-60[5] | 345.49 |
| | 6 | Minex 7[6] | 238.80 |
| | 7 | Arcosolv PTB[7] | 1.99 |
| | 8 | Disparlon 6700[8] | 11.07 |
| | 9 | CoatOSil 2810[9] | 25.95 |
| | 10 | Tinuvin 292[10] | 15.18 |
| | 11 | DC-57[11] | 2.72 |
| | 12 | Byk-361[12] | 3.98 |
| | 13 | Butyl Acetate[13] | 115.1 |
| | 14 | Ektapro EEP[14] | 60.33 |
| | 15 | DC-3074[15] | 178.44 |
| | 16 | Byk-501[16] | 2.87 |
| | 17 | Syloid 221[17] | 86.38 |
| Part B | 18 | Silquest A-2639[18] | 115.09 |
| | 19 | KBE-903[19] | 117.62 |
| | 20 | KBM-903[20] | 223.59 |
| | 21 | U-220H[21] | 33.20 |
| | 22 | Aromatic 100[22] | 293.19 |

[1]Cycloaliphatic epoxy resin commercially available from Asahi Denka.
[2]Surfactant commercially available from Rhodia.
[3]Pigment wetting agent commercially available from Byk Chemie.
[4]Defoamer commercially available from Ultra Additives.
[5]Titanium dioxide commercially available from Huntsman.
[6]Nephylene syenite commercially available from Unimin Specialty Minerals.
[7]p-tertiarybutyl ether solvent commercially available from Lyondell.
[8]Thixatrope commercially available from King Industries.
[9]Epoxy functional silicone resin commercially available from Momentive Performance Chemicals.
[10]Amine light stabilizer commercially available from Ciba.
[11]Flow additive commercially available from Dow Corning.
[12]Leveling additive commercially available from Byk Chemie.
[13]Solvent commercially available from Eastman.
[14]Ethoxy ethyl propionate commercially available from Eastman.
[15]Methoxy functional silicone resin commercially available from Dow Corning.
[16]Defoamer commercially available from Byk Chemie.
[17]Silica flatting pigment commercially available from Grace.
[18]Aminoneohexylmethyldiethoxysilane commercially available from Momentive Performance Chemicals.
[19]Aminopropyltriethoxysilane commercially available from Shin-Etsu.
[20]Aminopropyltrimethoxysilane commercially available from Shin-Etsu.
[21]Dibutyltin diacetylacetonate commercially available from Kaneka America.
[22]Solvent commercially available from Chevron.

Example 2

A coating composition was prepared using the components and amounts identified in Table 2. Part A was prepared by combining components 1 through 8 in a one quart can. The can containing the mixture was then placed on a Hockmeyer mixer fitted with a Cowles blade. The pigment was dispersed to 6 hegman fineness of grind and the thixatrope activated by dispersing the mixture at high speed for 30 minutes. During this time the temperature rose from 23° C. to about 77° C. The temperature was then lowered to 55° C. before addition of components 9 through 16. The combined mixture was then mixed until uniform. At this point, component 17 was sifted into the stirred mixture over 15 minutes. Stirring was continued for another 10 minutes after addition of component 17 to ensure uniformity. Part A had a Brookfield viscosity of 6500 cP at 25° C. and a calculated epoxide equivalent weight of 1218.25 grams per equivalent.

Part B was prepared by combining components 18 and 19 in a one quart can. The mixture was stirred with a metal spatula until uniform, which required less than 5 minutes. Part B had a calculated amine equivalent weight of 119.0 grams per equivalent and a Brookfield viscosity of less than 10 cP at 25° C.

TABLE 2

| Part | Component | Description | Amount (grams) |
|---|---|---|---|
| Part A | 1 | Adeka EP-4080E[1] | 179.38 |
| | 2 | Rhodafac RE-610[2] | 5.92 |
| | 3 | Byk-P105[3] | 7.11 |
| | 4 | Foamtrol 110[4] | 3.15 |
| | 5 | TR-60[5] | 312.04 |
| | 6 | Minex 7[6] | 215.7 |
| | 7 | Arcosolv PTB[7] | 1.80 |
| | 8 | Disparlon 6700[8] | 10.0 |
| | 9 | Photomer 6891[23] | 112.79 |
| | 10 | Tinuvin 292[10] | 13.71 |
| | 11 | DC-57[11] | 2.46 |
| | 12 | Byk-361[12] | 3.60 |
| | 13 | Butyl Acetate[13] | 104.01 |
| | 14 | Ektapro EEP[14] | 54.48 |
| | 15 | DC-3074[15] | 161.16 |
| | 16 | Byk-501[16] | 2.60 |
| | 17 | Syloid 221[17] | 78.01 |
| Part B | 18 | KBE-903[19] | 747.28 |
| | 19 | U-220H[21] | 56.23 |

[23]Urethane acrylate oligomer commercially available from Cognis.

Example 3

200.0 grams (0.1516 equivalents) of Example 1, Part A was combined with 29.66 grams (0.1771 equivalents) of Example 1, Part B. The mixture was sprayed on test panels with a Devilbiss air atomizing spray gun. Sand blasted steel panels (4"×7"×1/16") with a 2-mil profile were used for conicol mandrel elongation. Aluminum panels (3"×6") were used for QUV-B accelerated weathering tests. Hardiplank cement fiber composite panels (4"×6") were used for Florida weathering and cyclic QUV-B/Freeze/Cleveland humidity exposure testing. The dry film thickness ranged from 0.004 to 0.005 inches on all test panels.

Example 4

200.0 grams (0.1641 equivalents) of Example 2, Part A was combined with 30.86 grams (0.1843 equivalents) of Example 1, Part B. The mixture was applied using the same spray equipment and test panels described in Example 3. The dry film thickness ranged from 0.004 to 0.005 inches on all test panels.

Example 5

200.0 grams (0.1641 equivalents) of Example 2, Part A was combined with 22.46 grams (0.1887 equivalents) of Example 2, Part B. The mixture was applied using the same spray equipment and test panels described in Example 3. The dry film thickness on all test panels ranged from 0.004 to 0.005 inches.

Results are set forth in Table 3.

TABLE 3

| Test | Example 3 | Example 4 | Example 5 |
|---|---|---|---|
| Dry to Touch, 6 wet mils, hours (ASTM D1640) | 0.5 to 1.0 | 0.5 to 1.0 | 2.0 to 3.0 |
| Dry Through, 6 wet mils, hours (ASTM D1640) | 5.0 to 6.0 | 5.0 to 6.0 | 6.0 to 7.0 |
| Conical Mandrel Elongation (ASTM D-522) After 3 days at 25 C. and 11 days at 60° C. | 4.5% | 4.5% | 0% |
| QUV-B Accelerated Weathering (ASTM G53) | | | |
| 60° Gloss - initial | 6.0 | 8.0 | 8.0 |
| after 4400 hours | 4.5 | 5.0 | 5.0 |
| Florida Weathering, 60° gloss | | | |
| initial | 3.6 | 7.5 | — |
| after 6 weeks | 3.5 | 6.4 | — |
| Cyclic Exposure Testing (1 Cycle = 7 days QUV-B, 2 days at 0 C., 5 days Cleveland Humidity) After 8 Cycles | No Blistering Cracking Or Loss of Adhesion | No Blistering Cracking Or loss of Adhesion | — |

The dry time, conical mandrel elongation and weathering data indicate the compositions of the present invention (Example 3), can have the same fast cure times and flexibility with comparable or better weatherability compared to prior art compositions of Example 4, which are based on epoxy resin, alkoxy or silanol functional siloxane resin and acrylate oligomer.

The conical mandrel elongation data of Example 3 and Example 4 are significantly higher than the conical mandrel elongation of Example 5. This indicates preferred aminosilane curatives of the present invention provide improved flexibility compared to prior art.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A coating composition comprising:
   (a) an alkoxy-functional and/or silanol-functional silicone comprising a compound represented by the general formula:

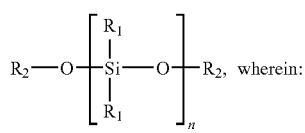

wherein:
   (i) each $R_1$, which may be the same or different, is selected from the group consisting of a hydroxy group, an alkyl group having up to six carbon atoms, an aryl group having up to six carbon atoms, and an alkoxy group having up to six carbon atoms;
   (ii) each $R_2$, which may be the same or different, is selected from the group consisting of hydrogen, an alkyl group having up to six carbon atoms, and an aryl group having up to six carbon atoms; and
   (iii) n is selected so that the silicone has a weight average molecular weight in the range of from 400 to 10,000;
   (b) an epoxy-functional silicone represented by one of the following structures:

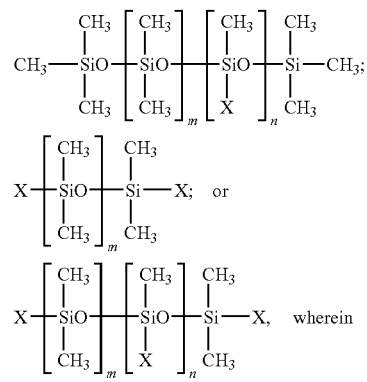

m is an integer having a value ranging from 1 to 10,000;
   n is an integer having a value ranging from 1 to 100;
   and each X, which may be the same or different, represents an epoxy containing group; and
   (c) a curing agent comprising an aminosilane.

2. The coating composition of claim 1, wherein at least one of the epoxy containing groups is represented by one of the following structures:

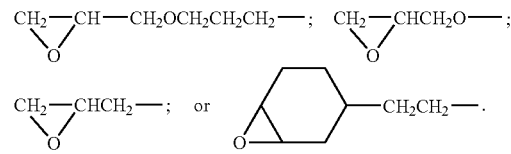

3. The coating composition of claim 1, wherein (a) and (b) are present in the composition in a weight ratio of at least 1:1.

4. The coating composition of claim 1, wherein the aminosilane has the general formula: Y—Si—(O—X)$_3$, wherein:
   (a) each X, which can be the same or different, is an alkyl, hydroxyalkyl, alkoxyalkyl or hydroxyalkoxyalkyl group containing less than six carbon atoms, and
   (b) Y is H(HNR)$_c$, wherein:
   (i) c is an integer of from 1 to 6; and
   (ii) each R is a difunctional organic radical independently selected from the group consisting of aryl, alkyl, dialkylaryl, alkoxyalkyl, and cycloalkyl radicals, and where R can vary within each Y molecule.

5. The coating composition of claim 1, wherein the aminosilane has the general formula:

$BR_eSi(OR^3)_{3-e}$, wherein 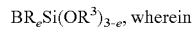

(a) B is a radical of the formula —$CR^2_2$—Y; wherein
   (i) $R^2$ is hydrogen or an alkyl radical having from 1 to 4 carbon atoms; and
   (ii) Y is a group containing a nitrogen atom;
   (b) $R^3$ is an alkyl radical having from 1 to 8 carbon atoms, and
   (c) e is 0, 1, or 2.

6. The coating composition of claim 5, wherein the aminosilane comprises cyclohexylaminomethylmethyldiethoxysilane.

7. The coating composition of claim 1, further comprising:
(d) a hydroxy-functional and/or epoxy-functional ingredient different from (a) and (b).

8. The coating composition of claim 1, further comprising:
(d) an epoxy-functional ingredient different from (b).

9. The coating composition of claim 8, wherein the epoxy-functional ingredient comprises an epoxy resin having more than one 1,2-epoxy group per mole.

10. The coating composition of claim 8, comprising:
5 to 80 percent by weight of component (a);
5 to 80 percent by weight of component (b);
1 to 30 percent by weight of component (c); and
1 to 50 percent by weight of component (d).

11. A coating composition comprising:
(a) an alkoxy-functional and/or silanol-functional silicone comprising a compound represented by the general formula:

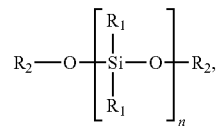

wherein:
(i) each $R_1$, which may be the same or different, is selected from the group consisting of a hydroxy group, an alkyl group having up to six carbon atoms, an aryl group having up to six carbon atoms, and an alkoxy group having up to six carbon atoms;
(ii) each $R_2$, which may be the same or different, is selected from the group consisting of hydrogen, an alkyl group having up to six carbon atoms, and an aryl group having up to six carbon atoms; and
(iii) n is selected so that the silicone has a weight average molecular weight in the range of from 400 to 10,000;
(b) an epoxy-functional silicone having a molecular weight of 750 to 5,000 that is represented by the general formula:

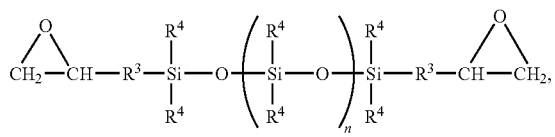

wherein:
(i) each $R^3$, which may be the same or different, is an alkylene containing 1 to 18 carbon atoms or an arylene group;
(ii) each $R^4$, which may be the same or different, is an alkyl group, an aryl group, a vinyl group, a glycol, an alkoxy group containing 1 to 8 carbon atoms, or an epoxy group; and
(ii) n is greater than or equal to 1; and
(c) a curing agent comprising an aminosilane.

12. The coating composition of claim 11, wherein (a) and (b) are present in the composition in a weight ratio of at least 1:1.

13. The coating composition of claim 11, wherein the aminosilane has the general formula: Y—Si—(O—X)$_3$, wherein:
(a) each X, which can be the same or different, is an alkyl, hydroxyalkyl, alkoxyalkyl or hydroxyalkoxyalkyl group containing less than six carbon atoms, and
(b) Y is H(HNR)$_c$, wherein:
(i) c is an integer of from 1 to 6; and
(ii) each R is a difunctional organic radical independently selected from the group consisting of aryl, alkyl, dialkylaryl, alkoxyalkyl, and cycloalkyl radicals, and where R can vary within each Y molecule.

14. The coating composition of claim 11, further comprising:
(d) a hydroxy-functional and/or epoxy-functional ingredient different from (a) and (b).

15. A coating composition comprising:
(a) an alkoxy-functional and/or silanol-functional silicone comprising a compound represented by the general formula:

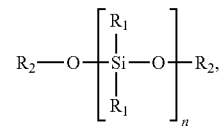

wherein:
(i) each $R_1$, which may be the same or different, is selected from the group consisting of a hydroxy group, an alkyl group having up to six carbon atoms, an aryl group having up to six carbon atoms, and an alkoxy group having up to six carbon atoms;
(ii) each $R_2$, which may be the same or different, is selected from the group consisting of hydrogen, an alkyl group having up to six carbon atoms, and an aryl group having up to six carbon atoms; and
(iii) n is selected so that the silicone has a weight average molecular weight in the range of from 400 to 10,000;
(b) an epoxy-functional silicone; and
(c) a curing agent comprising an aminosilane having the general formula:

Y—Si—(O—X)$_3$, wherein:

(a) each X, which can be the same or different, is an alkyl, hydroxyalkyl, alkoxyalkyl or hydroxyalkoxyalkyl group containing less than six carbon atoms, and
(b) Y comprises 4-amino-3,3-dimethylbutyl.

16. The coating composition of claim 15, wherein the aminosilane comprises 4-amino-3,3-dimethylbutyl trimethoxysilane and/or 4-amino-3,3-dimethylbutyl dimethoxymethylsilane.

17. The coating composition of claim 15, wherein the epoxy-functional silicone is represented by one of the following structures:

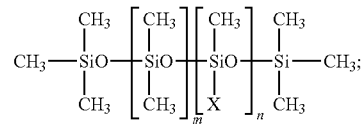

-continued

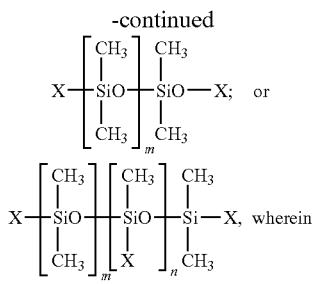

m is an integer having a value ranging from 1 to 10,000;
n is an integer having a value ranging from 1 to 100;
and each X, which may be the same or different, represents an epoxy containing group.

18. The coating composition of claim 17, wherein at least one of the epoxy containing groups is represented by one of the following structures:

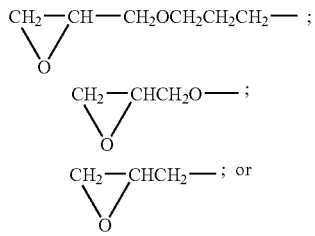

-continued

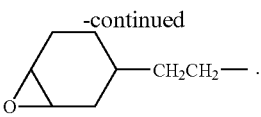

19. The coating composition of claim 15, wherein the epoxy-functional silicone is represented by the general formula:

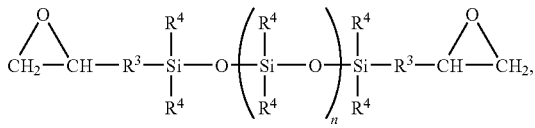

wherein:
(i) each $R^3$, which may be the same or different, is an alkylene containing 1 to 18 carbon atoms or an arylene group;
(ii) each $R^4$, which may be the same or different, is an alkyl group, an aryl group, a vinyl group, a glycol, an alkoxy group containing 1 to 8 carbon atoms, or an epoxy group; and
(ii) n is greater than or equal to 1.

20. The coating composition of claim 15, further comprising:
(d) a hydroxy-functional and/or epoxy-functional ingredient different from (a) and (b).

* * * * *